United States Patent [19]

Saxon

[11] 4,221,764
[45] Sep. 9, 1980

[54] HORIZONTAL EXTRACTOR

[75] Inventor: Arthur F. Saxon, Pittsburgh, Pa.

[73] Assignee: Dravo Corporation, Pittsburgh, Pa.

[21] Appl. No.: 969,986

[22] Filed: Dec. 15, 1978

[51] Int. Cl.³ .................... B01D 11/02; B65G 47/19; B65G 47/40

[52] U.S. Cl. .................................. 422/268; 198/526; 198/702; 198/706; 198/708

[58] Field of Search ............... 198/702, 703, 706, 708, 198/711, 493, 611, 526, 670, 671, 495, 532, 712, 710; 422/268

[56] References Cited

U.S. PATENT DOCUMENTS

| 658,657 | 9/1900 | Le Grand | 198/526 X |
| 1,752,979 | 4/1930 | Ehrhart | 198/703 X |
| 1,793,246 | 2/1931 | Philips | 198/495 |
| 2,650,693 | 9/1953 | King | 198/532 |
| 2,663,624 | 12/1953 | Hutchins et al. | 198/706 X |

Primary Examiner—James L. Rowland
Attorney, Agent, or Firm—Parmelee, Miller, Welsh & Kratz

[57] ABSTRACT

Horizontal basket extractors with a continuous conveyor with spaced baskets or cells are arranged with traveling splitters movable along the top and/or bottom runs of the conveyor synchronously with the baskets arranged to divert a continuous flow of solids and/or liquids from a preceding basket to a following one, thereby eliminating the intermittent feeding of the material being charged in succession but avoiding passage of the material through the spaces between the baskets.

7 Claims, 10 Drawing Figures

HORIZONTAL EXTRACTOR

This invention is for horizontal basket extractors or the like apparatus where material, either liquid or solids, or both, are continuously discharged from a fixed source of supply into a succession of spaced baskets or cells carried by endless conveyor chains along generally horizontally extending upper and lower runs.

The invention is especially applicable for use with extractors where a continuous conveyor having parallel endless chains is arranged with upper and lower runs that extend in a generally horizontal direction, the chains carrying a succession of spaced baskets or cells with perforate bottoms extending crosswise between them. The baskets are pivotally connected with the chains at each end and when the conveyor moves downwardly from the upper run to the lower one, the baskets remain upright. Generally where the baskets travel upwardly from the lower run to the upper one they are inverted to completely dump their contents and then restored to an upright position for the beginning of the horizontal upper run. Typically, there are trays beneath the upper and lower runs to collect and dispose of extract or filtrate that drains from the baskets. It has heretofore been necessary to intermittently move the conveyor baskets and/or intermittently discharge materials, solid or liquid, into the baskets in order to avoid the flow of material through the spaces between the baskets as they moved from beneath one charging or loading station while another moved into position at that station.

The present invention avoids the complications of such intermittent or closely synchronized operations by providing oppositely sloped divides or splitters along one or both horizontal runs of the basket conveyor and which travel with the baskets but over the spaces between the baskets to divert the continuous flow of materials, be they solids, a liquid or a slurry from the basket ahead into the following one as the baskets move in succession under a loading or charging station or stations.

With such an arrangement, the splitters are on a separate endless conveyor with the lower run of such conveyor moving above the baskets. At the end of the horizontal run of the baskets the splitters lift away from the basket which, of course, move downwardly and the splitters are carried by the upper run of their conveyor horizontally back to the starting end of their travel. Often horizontal extractors of this type are desired for use with large volumes of materials so that the baskets are several feet in length from end to end and, for most effective results, the bed of solid or semi-solid material discharged into each basket should be fairly uniform, both from the standpoint of depth and, as in the case of a semi-liquid slurry, of fairly uniform consistency from end to end. Also, as a liquid, generally of a solvent nature, is discharged over the baskets after they have been loaded with the material from which the solvent will form an extract, or even where the liquid simply washes the solids as it percolates through the bed, the distribution of liquid over the contents of the baskets should be uniform from end to end of each basket.

Usually the material or liquid is discharged into the baskets from a supply source directly above the baskets to fall evenly into the baskets, but with the return run of the splitters above the baskets, such overhead direct feed of the materials, liquids or solids, requires that either the splitters be constructed so as to avoid retaining any of the material when they pass under the overhead source of supply, or that the material be introduced from distributor means extending laterally between the lower and upper runs of the splitter conveyor and designed to effect substantially even discharge of material therefrom across the full length of the baskets.

The present invention therefore provides splitters as above first explained to prevent material, solids, slurry or liquid from a continuous supply, but to provide splitters of a shape which, on the return run under an overhead supply source, will not interfere with the proper feeding or distribution of the falling overhead stream into the baskets, or alternatively, to provide discharge means extending laterally between the upper and lower runs of the splitter conveyor arranged to uniformly discharge the material substantially uniformly across the full end-to-end lengths of the baskets.

Additionally, the invention provides means for driving the splitter conveyor and the basket conveyor at exactly the same linear speed so that the splitters will always be exactly positioned with relation to the baskets during their travel in cooperation with the baskets and not get ahead or behind in their relation to the baskets. While this may be accomplished in several ways, the present invention specifically discloses one such arrangement where the basket conveyor has means cooperating with the splitter conveyor to move the splitters in exact synchronism and isochronism to the basket conveyor.

The invention will hereinafter be described in connection with an extractor in which a slurry of solids and liquid is continuously discharged from a source of supply to successively load the empty moving cells or baskets after which the liquid from the slurry drains into an underlying tray and thereafter the baskets travel under a succession of continuously flowing liquid discharge sparger nozzles where miscella, solvent or other liquids percolate through the solids in the basket to produce an extract or wash the contents of the baskets after extraction has been completed. However, the invention is not restricted to such use or purpose.

The invention may be more fully understood by reference to the accompanying drawings, in which:

FIG. 1 is a schematic longitudinal vertical section of an extractor embodying my invention.

FIG. 2 is a fragmentary view on a larger scale representing a transverse section through one cell in relation to the cells ahead and following, fragments only of these two latter ones being shown and showing the feed inlet located directly above the extractor, with the splitters being of a diamond shape. The same view also shows an arrangement for driving the splitter conveyor to keep the splitter directly over the spaces between the baskets.

Figure 2:
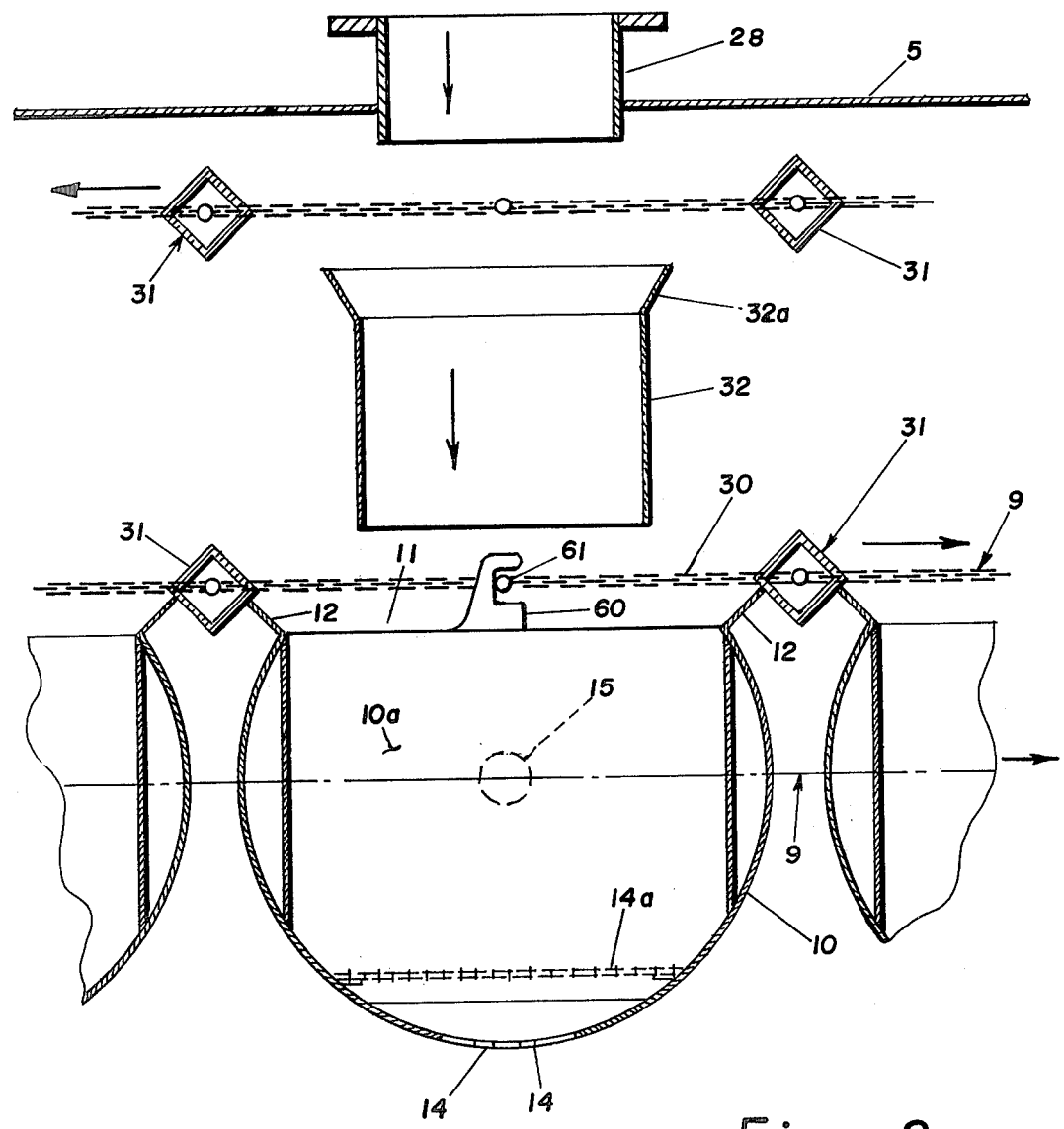
Figure 7:
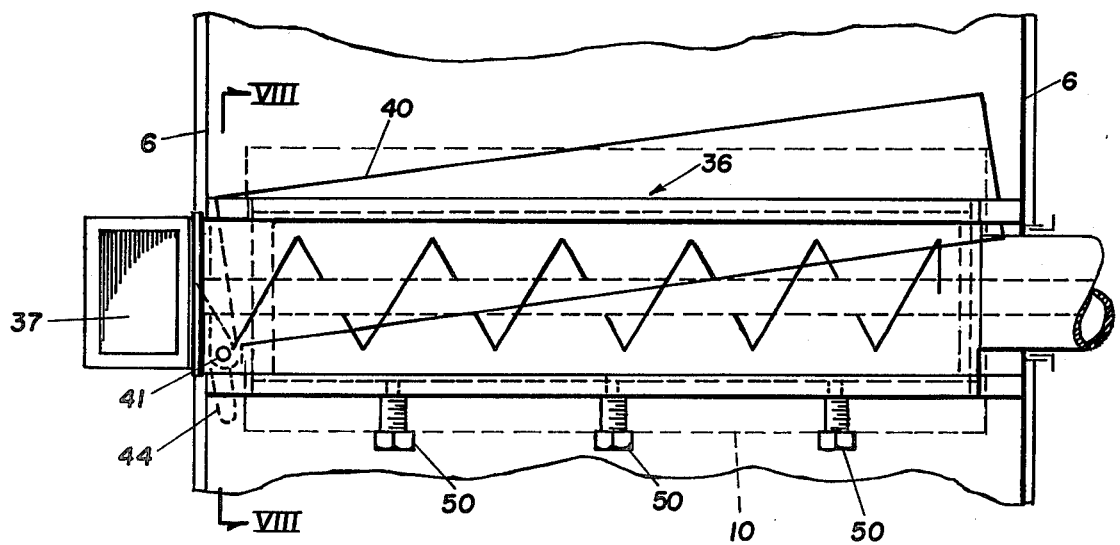

FIG. 7 shows in schematic plan a screw type feed conveyor arranged to receive material, such as slurry, from an inlet at one side of the extractor and designed to extend crosswise between the upper and lower runs of the splitter conveyor for the full length of the baskets, but which could also be used above both runs of the splitter conveyor with diamond shaped splitters as in FIG. 2. An adjustable plate forms a discharge opening for the material to assure a more even discharge of material along the full length of each basket.

Figure 8:
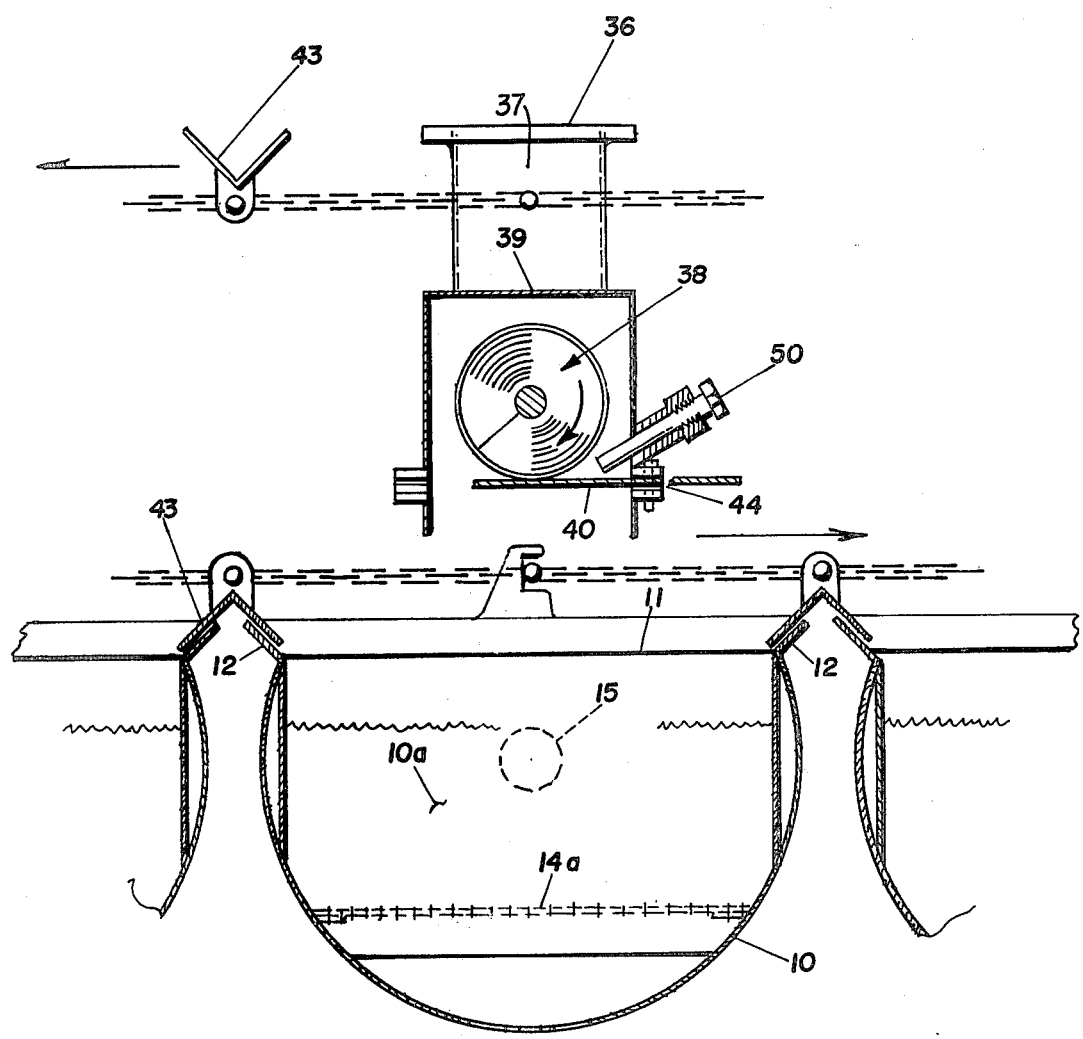

FIG. 8 is a transverse section in the plane of line VIII—VIII of FIG. 7.

Figure 9:
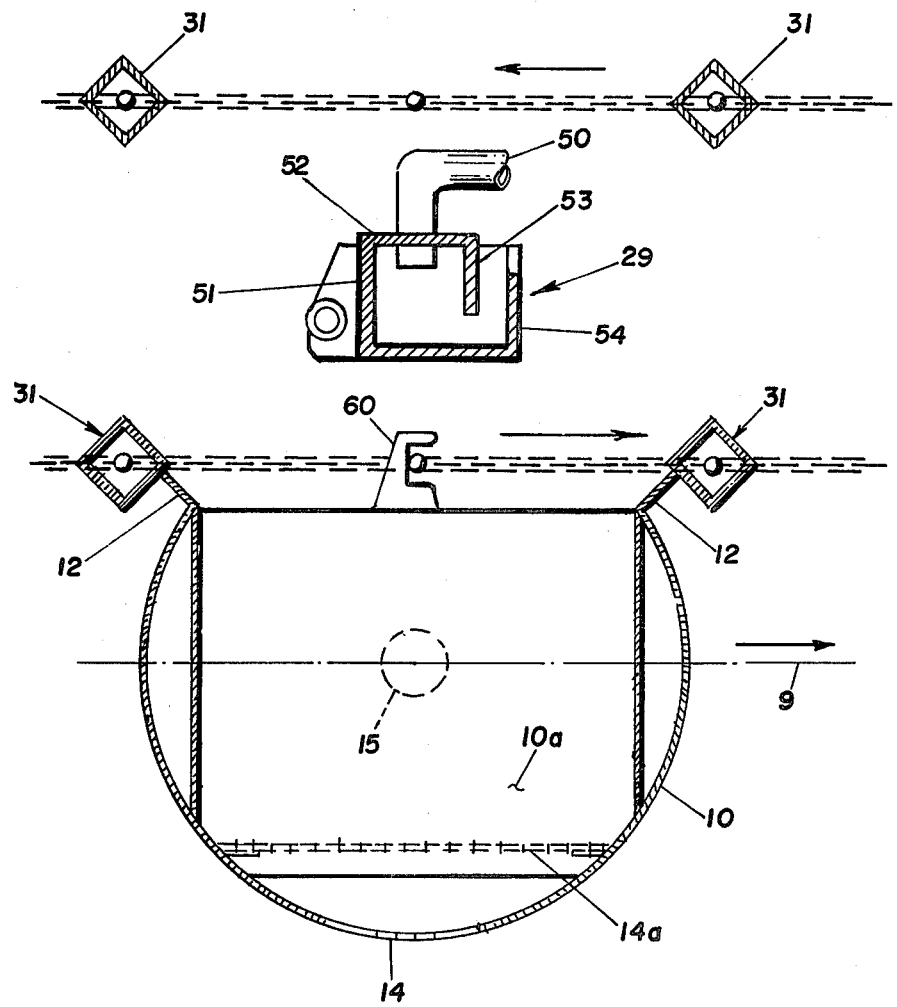

FIG. 9 is a fragmentary transverse section through a basket with a liquid discharge manifold or sparger having a serrated edge from which liquid flows to provide a more uniform flow of liquid therefrom into the baskets.

Figure 10:
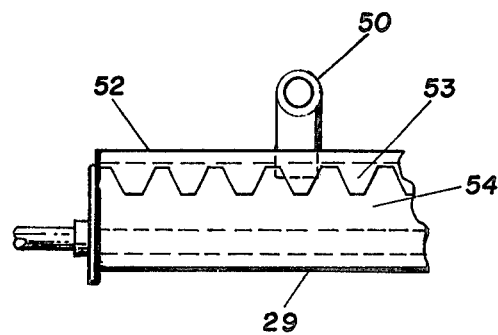

FIG. 10 is a fragmentary front elevation of one end of the manifold shown in FIG. 9.

Figure 1:
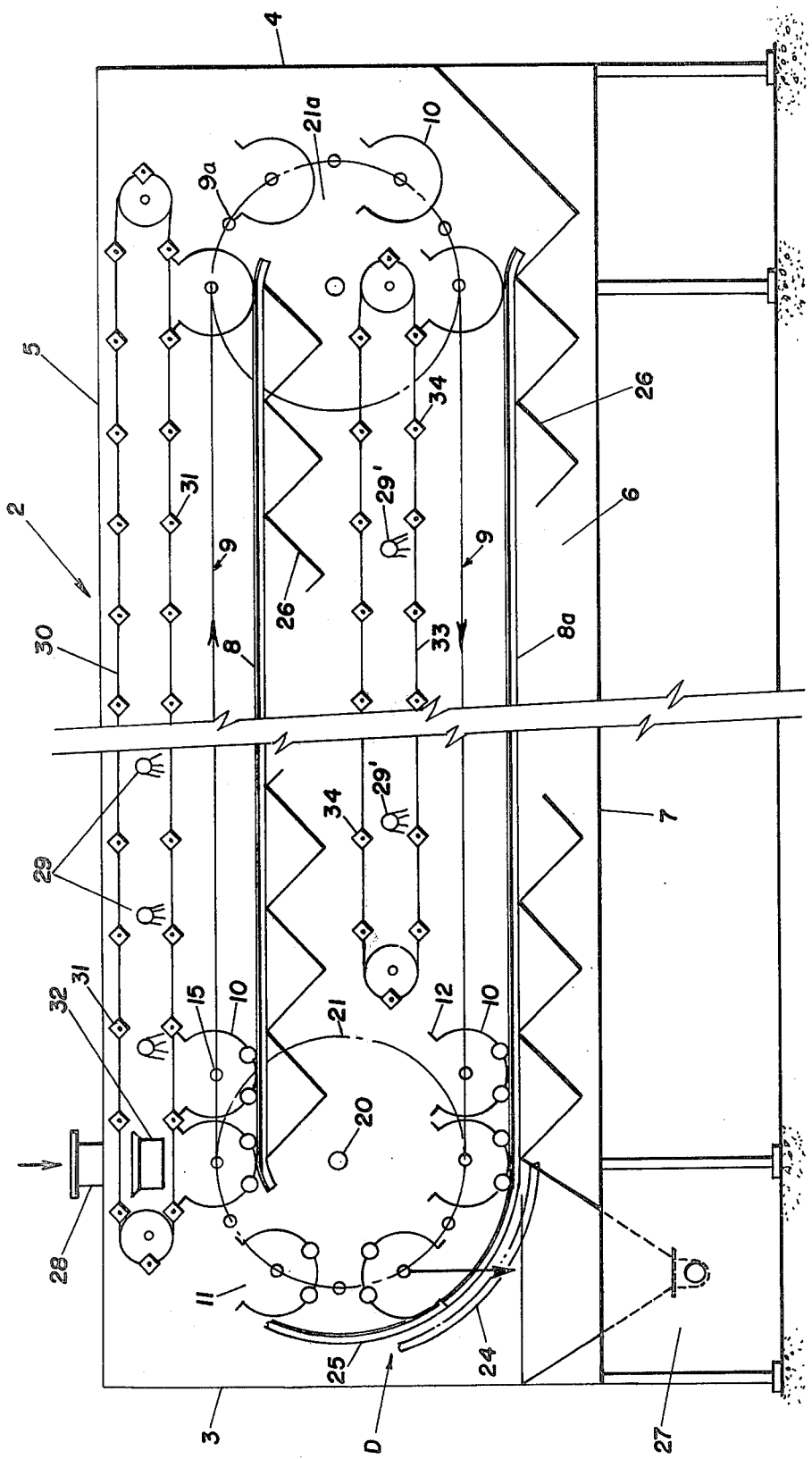

Referring first to FIG. 1 showing the overall arrangement with a mid-portion of the apparatus broken away to avoid illustration on too small a scale, 2 designates a generally rectangular cubical enclosure with opposed end walls 3 and 4, a top 5 and side walls 6. A tight bottom is indicated at 7.

Inside the enclosure and spaced inwardly from each side wall and downwardly from the top there are transversely spaced horizontally extending continuous rails 8, only one of which is visible in FIG. 1, the ends of which are spaced from the end walls of the enclosure. Spaced directly below these rails but much closer to the bottom of the enclosure are two similar rails 8a. The upper run of the continuous conveyor 9 travels on and is supported by the upper rails 8 and the lower run of the same conveyor by the rails 8a.

The conveyor 9 itself comprises side chains 9a which extend lengthwise of the enclosure and supporting between them a series of spaced crosswise extending similar baskets or cells 10. Each such basket or cell is of generally cylindrical contour with end walls 10a and an open top 11 with outwardly and upwardly flared lips or flanges 12 along each edge of the opening. The bottoms of the semicylindrical trough-like bodies 10 have drainage openings 14 therethrough, here indicated as longitudinally elongated slits, and spaced above the bottom is a screen 14a.

Figure 3:
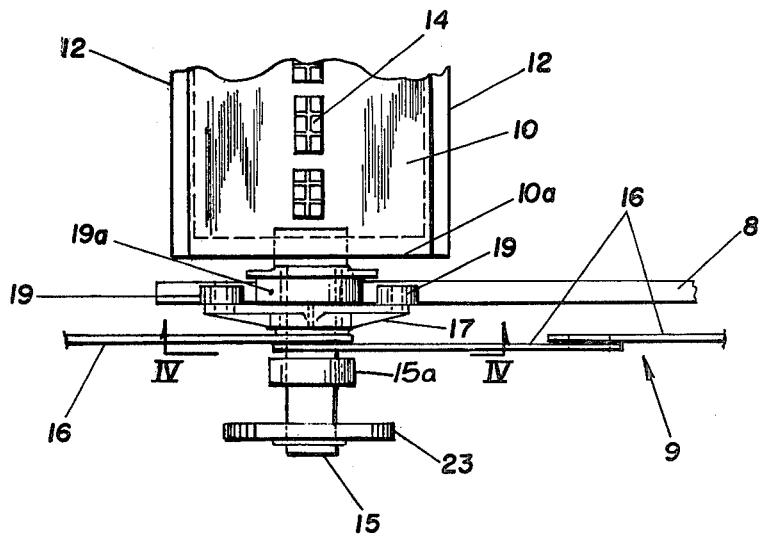
FIG. 3 is a fragmentary plan view looking down on the cell and trunnion arrangement at one end of a single cell or basket just as it is beginning its upward travel from the lower run to the upper one and before it is inverted to dump its load and with the bottom screen omitted.

Each basket has an axially extending trunnion 15 thereon (FIG. 3). There are links 16 with an eye at each end. Each link has one eye rotatably fitted about the trunnion of one basket and the other eye of the same linek is rotatably fitted about the trunnion of the basket ahead, while a second link is similarly engaged with the trunnion of the basket behind, so that each trunnion forms a pivotal connection for two links, and the entire series of links so arranged constitutes a continuous conveyor chain at one end of the series of buckets to provide a conveyor chain schematically indicated as a chain in FIG. 1 connecting all of the buckets, and the opposite end of each basket is similarly constructed and arranged.

Figure 4:
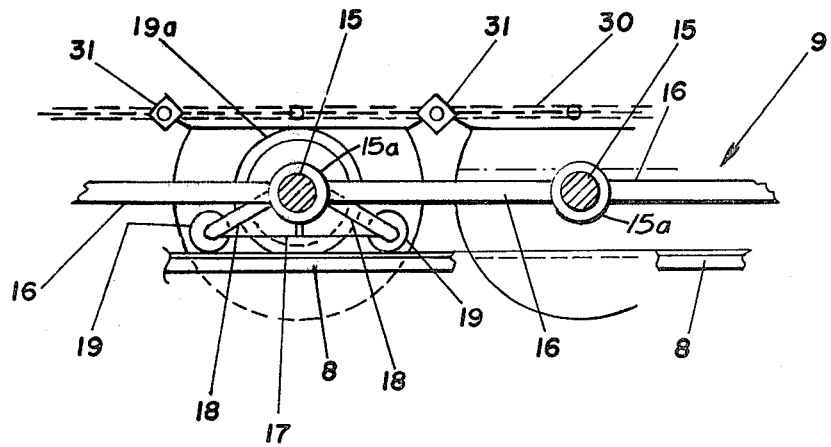
FIG. 4 is an elevation of the cell or basket shown in FIG. 3, but with the end gear wheel removed.

Each trunnion, or at least one end of each bucket and preferably on both ends, has a spreader 17 (see FIGS. 3 and 4) through which the trunnion rotatably passes and which has two divergent arms 18, each with a small wheel or roller 19 at its outer end. These spreaders and rollers are so positioned that the rollers are supported on and roll along the rails 8 and 8a of the respective runs of horizontally elongated loops in which they travel and stabilize the baskets in an upright position. There is also a flanged wheel 19a on each trunnion that supports the baskets and guides them on the rails along which they travel. Also, there are free-turning collars 15a on the trunnion at each end (see FIGS. 3 and 4).

Assuming that the direction of travel of the conveyor and baskets along the upper run is from left to right as viewed in the drawing, the stabilizing rollers on the baskets run off the tracks 8 near the right end of the enclosure and hang from the chain in an upright position and, as their travel reverses, the stabilizing rollers of the baskets will then move onto the lower horizontal tracks or rails 8a.

Figure 5:
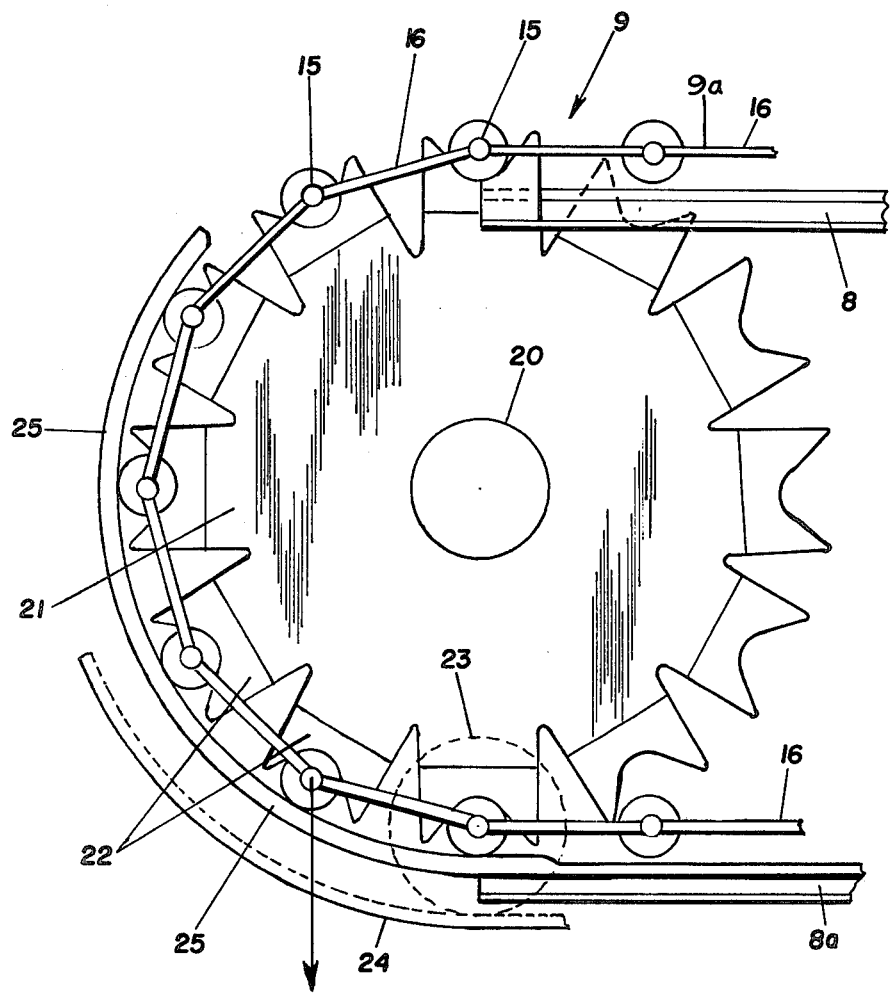
FIG. 5 is a fragmentary schematic elevation of the end sprocket and dump gear at that end of the apparatus shown in FIG. 3.

At the opposite or left end of the enclosure as shown in the drawing (FIG. 5) there is a shaft 20 which carries two sprocket wheels, one for each chain, but only one of which designated 21, is seen in the drawings. The sprocket teeth 22 of the sprocket wheels are spaced to, in turn, engage one of the free-turning collars 15a on each of the trunnions at the ends of the baskets from the lower run of the conveyor to the upper one. The baskets themselves are omitted for purpose of clarity. The sprocket may be continuously driven during operation by a driving motor (not shown) at a uniform speed. Also, if desired, there is provided a similar sprocket 21a (FIG. 1) at the right end of the conveyor but, with a long machine and heavy loads, both would be synchronously driven.

The trunnion on at least one end of each basket has a gear wheel 23 (see FIG. 5) for inverting the tray to dump its contents thereon of a diameter and gear pitch to mesh with the teeth of a curved rack 24 concentric anbout the axis of the sprocket wheel and so located that the gear wheel 23 engages the rack just before the leading roller 19 of each basket nears the end of the horizontal track 8a. The curved rack is of sufficient arc to rotate the basket a full 180° so that at approximately position D (FIG. 1), it has turned to a completely inverted position. There is a curved rail 25 which is concentric with the rack 24 on which the other of the free-turning collars 15a travel to prevent the baskets, when inverted and until they move above a horizontal plane, from posibly falling away from the sprocket wheel teeth and assure proper engagement of the gear wheels 23 and the curved rack 24 during the dumping operation.

Within the enclosure under the upper rails 8 and below the lower tracks 8a are one or more, preferably a succession, of fixed trays 26 above which the basket moves and into which liquids draining from or percolating through the contents of the baskets moving above the trays. Pipes for carrying the liquid extracts from the trays to a selected place of disposal are not shown, but one arrangement for this purpose, disclosed in the copending application of George Karnofsky, Ser. No. 41769, filed May 23, 1979, for extraction of bitumen from oil sand, and assigned to the same assignee as this application, fully illustrates one such arrangement. Under the outer periphery of the sprocket wheels 21 where the baskets are inverted there is a compartment 27 for receiving and disposing of solids which are dumped from the baskets at this station.

There is disclosed a pipe or chute 28 extending through the roof of the enclosure through which solids or a slurry of solids and liquid may be continuously fed to and be received in the succession of baskets near the beginning of the upper run, as here shown, the left end of the conveyor. Spray pipes or spargers 29 are arranged at intervals above the baskets of the upper run between the chute 27 and the right end of the upper run from which liquid is continuously sprayed to percolate through the solids or slurry in the baskets and be caught in the trays below the upper run of the conveyor. Also spray manifolds 29' may be positioned above at least some of the baskets of the lower run and the extract that results drains into the trays below the baskets of the lower run, reference being again made to said Karnofsky application showing one particular arrangement.

Located above the upper run of the basket conveyor and generally parallel therewith there is an elongated endless conveyor 30 comprising parallel endless chains between which are transversely extending flow diverters or flow splitters 31 at regular spaced intervals therealong. The splitters 31 are spaced along the conveyor chains so that the ones on the lower run of this conveyor will be centered above the space between each two baskets and they have downwardly diverging top surfaces with the spread at their lower edges being such that the forward surface overhangs the rear edge of the leading basket and its rear sloping surface overhangs the forward edge of the following basket of two baskets. The splitters 31 are attached at their opposite ends to the chains of the conveyor 30 in such manner that they cannot swing or tilt and therefore they are reversed as they travel from the lower run to the upper run of the conveyor 30.

Referring to FIG. 2, there is shown, on an enlarged scale, a portion of the top 5 of the enclosure through which the chute 28 extends cross the width of the enclosure about equal to the end-to-end length of the baskets. Below this are the upper and lower runs of the conveyor 30. The splitters 31 are here shown of diamond shape in cross section, and it will be seen that the top surfaces on the lower run effectively cover the spaces between adjacent baskets while these same surfaces are on the lower side of the splitters but the surfaces which are not the upper surfaces are the inverted image of the lower ones. Consequently, as the splitters of the upper run move under the continuous stream of material, such as a slurry of sand and liquid, they only briefly divide the falling stream without interrupting it.

There is a transversely elongated structure having side walls 32 with oppositely flared upper edges 32a supported between the top and bottom runs of the splitter conveyor with its top just clear of the undersurface of the path of travel of the upper run of the splitters and its bottom edges clear of the path of travel of the under run of the splitters. This structure provides a confining enclosure under the upper run of splitters for redirecting the split stream of falling material below the upper run of splitters back into a vertical path into the baskets moving under the lower run of the splitter conveyor.

Liquids may be supplied to the spargers through pipes or manifolds entering the enclosure laterally between the upper and lower runs of the splitter conveyor so that the diamond shape is needed only when material is fed vertically from above both runs of the splitter conveyor, and not laterally as hereinafter more fully described.

There is a similar splitter conveyor 33 above the lower run of the basket conveyor with splitters or flow diverters 34 spaced at intervals therealong, the same as the ones on the upper splitter conveyor, that is, to divert the continuously falling stream of material from one basket to the next without it flowing through the spaces between successive baskets. In this instance only, liquid is sprayed into the baskets so that the nozzles 29' are located between the upper and lower runs of the splitter conveyor and, consequently, the splitters may be of simple inverted V form in the lower run of this conveyor which, in the upper run, is then inverted to an upright V.

In FIGS. 7 and 8 there is disclosed more or less schematically an apparatus for use where the material is fed to the baskets or cells from one side of the enclosure instead of through the top with a screw conveyor extending crosswise of the enclosure between the upper and lower runs of the splitter conveyor. In these views, where applicable, similar reference numerals are applied to similar parts, such as the baskets or cells, the splitter conveyor, the top and side walls of the enclosure.

Referring first to FIG. 7, fragments of the opposite side walls 6 of the enclosure are indicated, and the outline of a single cell or basket 10 is schematically indicated, for purposes of reference only, in dotted rectangular outline. Above this basket there is shown, in outline, a feeder indicated as 36, and it has an upwardly opening material receiving inlet connection 37 (see also FIG. 8), the lower end of which terminates at the outer end of an axially rotatably conveyor screw 38 with an enclosure 39 that extends crosswise of the lower run of the basket conveyor and over the basket or cell 10. The bottom of this enclosure is provided by a flat plate 40 pivoted to the screw enclosure 39 at 41 and which can be adjusted in a horizontal plane beneath the conveyor screw to provide a discharge opening 42 of increasing width from the inlet end of the enclosure at the left toward the right to allow increasing freedom to the discharge of material with the increase in distance from the feed end of the screw enclosure toward the end of the screw remote from the inlet and thereby assure a generally uniform discharge of material along the full length of the underlying basket. The screw conveyor has a central shaft connected with driving means, not shown.

FIG. 8 shows in transverse section the foregoing arrangement in relation to the traveling cell and the splitters 43 on the splitter conveyor chain, and it will be seen that with this arrangement the splitters do not require symmetrical upper and lower stream splitting surfaces but on the lower run of the splitter conveyor or of a simple inverted V shape. It will be seen in this view also that the enclosure for the conveyor screw is formed with an extension 44 arranged to provide a slit through which the plate 40 is adjustable while the plate is provided with an underlying rigid support throughout its length.

Since material may become lodged in the screw conveyor, and especially on the bottom plate, FIG. 8 discloses the provision of a nozzle at 50 through which liquid under pressure may be projected as needed on the plate 40 in the direction of rotation of the conveyor screw. While for clarity of illustration only a single nozzle is shown in FIG. 8 and several have been indicated in FIG. 7, such nozzles may be provided as and if required at intervals along the length of the screw enclosure. The liquid so introduced will be received in the baskets and drain through the material and, desirably, may be a solvent for percolation of an extract from the solid material being moved by the conveyor screw. Also, in some cases, as where evaporation of solvent is not a factor, air or other compatible gas could be substituted for liquid.

As previously explained, after the solids or semisolids are charged into the baskets, the baskets move beneath one or more, and usually a series, of liquid discharge manifolds or spargers. A preferred form of sparger is shown in FIGS. 9 and 10. In these figures also, similar reference numerals indicate similar parts, so far as applicable, to reference numerals in other figures. Like FIG. 8, only a single unit is illustrated with a sparger 29 shown in section over a traveling basket or cell 10. Splitters are indicated at 31. The sparger extends crosswise of the extractor above the full length of the basket and is positioned between the upper and lower runs of the splitter conveyor. Solvent, or other liquid for preparing an extraction or diffusion from the solid material or for merely washing it is supplied to the sparger (see FIG. 10) through a supply pipe 50. The sparger has a side wall 51 that supports a cover 52 along the front edge of which is a depending continuous baffle 53 that extends downwardly into the trough below the top edge of the forward wall 54 of the trough. The supply pipe 50 enters the trough through the top and desirably terminates above the lower edge of the baffle 53.

Liquid supplied to the trough overflows the edge of the forward wall 54 of the trough, said wall being deeply serrated and desirably the lower edge of the baffle 53 terminates below these notches. The inlet and baffle arrangement reduces turbulence at the discharge edge of the trough and distributes the liquid in the trough to a uniform depth along its length with little disturbance. The notches tend to spread the discharge more nearly into a continuous falling sheet of liquid than would be provided, for example, by a perforated pipe from which the liquid would tend to discharge in isolated jets such as might emerge from a series of nozzles.

Figure 6:
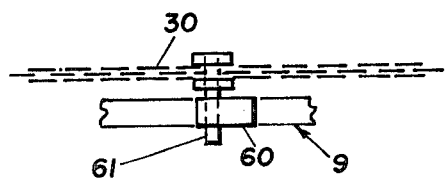
FIG. 6 is a fragmentary end plan view of one arrangement for driving the splitter conveyor directly from the basket conveyor.

It has been pointed out that the basket conveyor and the splitter conveyors 30 and 33 must travel at the same linear speed to always assure that, once properly indexed, a splitter will be and remain centered above the space between each two baskets even though the basket conveyor is much longer than the upper or lower splitter conveyors, and there may be a greater number of baskets or cells on the basket conveyor than there are splitters on either splitter conveyor. Various drives for accomplishing this result may be devised for moving the splitter conveyor. One simple expedient for accomplishing this purpose is best seen in FIGS. 2 and 6, where one or both end walls of each basket has an extension, such as the hook-like extension 60 on one, and preferably both, ends thereof. The splitter conveyor chain 30 (and also 33) is initially indexed to bring the equally spaced splitters 31 of the lower run of the splitter conveyor over the spaces between the equally spaced basket. Then cleats or cross pins 61 (see FIG. 6) are fixed to the splitter conveyor chains in such a manner that the travel of the buckets will successively engage the splitter conveyor cleats or chains, several baskets being always engaged with several splitter chain cleats, so that, considering the upper run of the basket conveyor, splitter and basket move at the same speed in the confronting runs of the two conveyors. At the right end of each run the baskets are carried downwardy and the splitter chain moves upwardly and the diverging travel releases in succession each basket from each cleat. At the left end, the baskets converge toward the splitter chains to engage the cleats. On the lower run of the basket conveyor, the baskets and splitters converge to interengage at the right end of the lower run and release at the left end of splitter conveyor 33.

With such an arrangement only the basket conveyor 30 need be power driven as, for example, by a conventional type of motor and gearing, not shown, driving the sprocket wheel 21, or with very large heavy load-carrying apparatus by also driving a second sprocket wheel, at the opposite end of the conveyor 30, synchronously with the first.

In most cases, as here indicated, the apparatus is supported in an enclosure because of heat and/or volatiles that may be involved in extraction or percolation, or even filtering, but where an enclosure is not required or would not be desired, a structural supporting frame, not enclosed, could of course be used.

I claim:

1. Apparatus of the traveling basket type wherein a succession of uniformly spaced transverse percolating baskets are moved along a horizontally extending run beneath a discharge means disposed transversely of the line of travel of the baskets for charging a slurry of solid particles and liquid material into the baskets, the improvements comprising:
   (a) said discharge means is arranged to discharge material continuously into the path of travel of the full end-to-end length of the interior of the baskets moving beneath it;
   (b) there is a continuous succession of transversely extending stream splitters at least coextensive in length with the interior of the baskets movable with the baskets between said discharge means and the baskets;
   (c) said stream splitters being positioned to move in a path above the baskets with a splitter covering the space between each two baskets and shaped to divert the flow of material from the discharge means across the space between two adjacent baskets from the leading to the following basket;
   (d) fixed tray means below the baskets at least coextensive with the width of the interior of the baskets arranged to receive from the slurry the liquid extract that drains through the baskets; and
   (e) means for moving the succession of baskets and stream splitters in isochronism over the tray means with the stream splitters traveling with the trays in operative relation through the entire length in which means for feeding the slurry and any additional means for supplying liquid from above the baskets into the baskets are provided.

2. Apparatus as defined in claim 1 in which there is a first material discharge means for discharging solids into the path of travel of the baskets moving beneath it followed by at least one liquid material discharge means similarly arranged.

3. Apparatus as defined in claim 1 in which there is a feed material discharge means for charging a slurry comprising divided solid material and a liquid into the basket followed by at least one liquid material discharge means for flowing a liquid onto the residual feed material after some of the liquid has drained from the slurry, said means for discharging solid material into the baskets comprising a screw conveyor extending crosswise of the basket conveyor and lengthwise of the baskets and flow splitters, said screw conveyor being positioned between the upper and lower runs of said second conveyor and having an inlet supply connection at one end outside the space between said upper and lower runs of the second conveyor, said screw conveyor having a discharge opening lengthwise of the conveyor screw arranged to deliver the divided solid material substantially uniformly throughout the entire interior length of the baskets.

4. Apparatus as defined in claim 3 in which the screw conveyor in which the discharge opening is of progressively increasing width transversely of the length of the discharge opening with the wider end being at the end of the conveyor most remote from the inlet supply connection.

5. Apparatus as defined in claim 3 in which the screw conveyor has fluid inlet nozzle means arranged to dislodge compacted solids from the interior of the screw conveyor.

6. Apparatus as defined in claim 1 in which the succession of baskets comprises a first endless chain basket conveyor means having an upper horizontal reach and a lower return reach with a vertical reach at each end wherein the baskets are maintained in a level position in the vertical travel at the terminal end of the upper reach and are temporarily inverted as they travel at the other end from the lower reach to the upper reach, and wherein there is a second endless chain conveyor above the upper reach of the first conveyor means by which the stream splitters of the lower reach move in operative position in relation above the spaces between successive baskets and in which there are spargers at intervals along the upper reach of the first conveyor arranged to continuously supply additional liquid across the full length of the interior of the succession of alternate baskets and splitters.

7. Apparatus as defined in claim 6 in which there is a first material supply means for charging material comprising said slurry into baskets and onto the flow splitters followed by at least one liquid material discharge means for flowing a liquid solvent material after the wet solid material remaining in the basket after some of the liquid content of the slurry has drained through the basket to then percolate through such wet solid material, wherein said means for discharging liquid material comprises a sparger having a trough extending crosswise above the basket conveyor and lengthwise of the baskets and flow splitters, said trough having spaced side walls which extend parallel lengthwise of the trough, a bottom, a cover of less width than the trough above, and a baffle depending from the cover toward but not to the bottom of the trough, means for introducing the liquid material into the trough below the cover and between the baffle and one side wall of the trough, the other side wall of the trough being spaced from the baffle and being continuously serrated along its length from its top edge toward but not to the bottom of the trough and to a level above the lower edge of said depending baffle.

* * * * *

UNITED STATES PATENT OFFICE
CERTIFICATE OF CORRECTION

PATENT NO. : 4,221,764
DATED : September 9, 1980
INVENTOR(S) : Arthur F. Saxon

It is certified that error appears in the above-identified patent and that said Letters Patent are hereby corrected as shown below:

Claim 1, clause (e), third line (Column 8, line 46), delete the word "trays" and insert --baskets--.

Signed and Sealed this

Fifteenth Day of September 1981

[SEAL]

Attest:

Attesting Officer

GERALD J. MOSSINGHOFF

Commissioner of Patents and Trademarks